(12) United States Patent  
Beal (10) Patent No.: US 6,352,300 B1
(45) Date of Patent: Mar. 5, 2002

(54) REAR WINDSCREEN FOR CONVERTIBLES

(76) Inventor: Rebecca Beal, 7031 Via Vista Dr., Riverside, CA (US) 92506

( * ) Notice: Subject to any disclaimer, the term of this patent is extended or adjusted under 35 U.S.C. 154(b) by 0 days.

(21) Appl. No.: 09/620,770

(22) Filed: Jul. 21, 2000

Related U.S. Application Data (60) Provisional application No. 60/145,567, filed on Jul. 26, 1999.

(51) Int. Cl.[7] .................................................. B60J 1/20
(52) U.S. Cl. ........................ 296/180.1; 296/85; 296/219
(58) Field of Search ........................... 296/180.1, 180.5, 296/85, 214, 219

(56) References Cited

FOREIGN PATENT DOCUMENTS

| FR | 1269220 | * | 7/1961 | ................. 296/214 |
|---|---|---|---|---|
| GB | 190208 | * | 12/1922 | ................. 296/85 |
| GB | 220465 | * | 8/1924 | ................. 296/85 |
| GB | 455874 | * | 10/1936 | ................. 296/214 |

* cited by examiner

*Primary Examiner*—Dennis H. Pedder
(74) *Attorney, Agent, or Firm*—Knobbe, Martens, Olson & Bear, LLP (57) ABSTRACT

A windscreen assembly for a Corvette Convertible automobile that comprises a wind breaking mesh net configured to be fastened in the rear of the passenger cockpit of the vehicle and of equivalent height as the windshield. The wind breaking mesh net is to be positioned in an upright manner and attached to the vehicle with an adapter apparatus using adapters located on opposing sides of the vehicle. The adapters positioned in such a way as to allow for their temporary attachment to the vehicle sides when the top of the Corvette Convertible is down. The completed assembly gives a method for securing a removable wind breaking mesh net to the vehicle thereby reducing interior wind noise while driving and does not require any permanent alterations to the existing vehicle design.

30 Claims, 5 Drawing Sheets

REAR WINDSCREEN FOR CONVERTIBLES

RELATED APPLICATIONS

This application claims the benefit of U.S. Provisional Application No. 60/145,567, filed on Jul. 26, 1999, entitled "WIND SCREEN FOR CORVETTE CONVERTIBLE."

BACKGROUND OF THE INVENTION

1. Field of the Invention

The present invention generally relates to automobiles, and, in particular, concerns a windscreen to be detachably mounted behind the seats in the rear portion of the cockpit of a convertible Corvette automobile.

2. Description of the Related Art

A problem that exists with the production of convertible automobiles is the high level of cockpit turbulence and noise present in the vehicle while driving. These problems are encountered when air passing over the front windshield of the vehicle creates a region of lowered pressure in the cockpit. The lowered pressure inside the cockpit and the higher pressure that exists in the area above the trunk space results in creating a current of air rushing in from the rear of the vehicle to the cockpit.

These rear-entering air currents create turbulence inside the cockpit and subject the occupants of the vehicle to conditions which may have a negative effect on their driving experience. Typically, a passenger is subjected to increased wind noise directly resulting from the turbulence. Excessive wind noise can be dangerous as it may render the driver with an impaired ability to hear other occupants of the vehicle as well as exterior noises such as emergency vehicle sirens. Turbulence is also responsible for an increase in wind chill inside the cockpit of the vehicle which can be uncomfortable for the vehicle occupants. Furthermore, cockpit turbulence can disrupt the hair styles and apparel of the occupants of the vehicle. A more significant consequence of turbulence may arise as loose items and papers within the cockpit may also be moved about violently and even hurled from the vehicle, endangering both the vehicle occupants and other drivers.

The annoying and potentially dangerous effects of in-cockpit turbulence in convertibles can be addressed using rear-mounted windscreens. Generally, windscreens are used to reduce rear-entering air into the cockpit. When in use, a windscreen reduces the amount of wind noise and turbulence encountered by vehicle occupants while driving. The presence of a windscreen significantly improves the safety of driving, pleasure, and comfort felt by the vehicle occupants.

A windscreen typically consists of an upright structure integrated into the rear portion of a convertible cockpit. The windscreen structure extends roughly to the same height as the front windshield of the vehicle and impedes the flow of rear-entering air into the vehicle. The presence of a windscreen results in an enclosed area surrounding the cockpit. The area of the cockpit is defined by the windshield in the front, passenger and driver windows on the sides, and the windscreen in the rear of the cockpit.

Such an enclosure attempts to reduce the effects of turbulence encountered by passengers. At the same time the windscreen must not impede a driver's ability to visualize objects in the rear of the vehicle. Therefore, the general design of a windscreen typically falls in one of two categories. In one windscreen design, a transparent material such as glass or screen material is used. In this design the driver is able to view objects to the rear of the vehicle directly through the windscreen. A second windscreen design leaves an open area which is not protected by the windscreen in the rear of the cockpit. In this design, there is a certain amount of turbulence still created in the cockpit and is typically not as efficient in reducing wind noise and turbulence as the aforementioned transparent design.

While the presence of a rear windscreen in a convertible aids in providing a safer, quieter and more comfortable zone inside the cockpit, it is also important to maintain the stylistic overall appearance of an open vehicle. Some convertible manufacturers choose to integrate windscreens into the factory designs of their vehicles. However, numerous convertible vehicles exist that do not have the benefit of any windscreen built into the original vehicle design. Convertible vehicle models, such as the Corvette manufactured by General Motors, do not come standard with any type of windscreen and no provisions are made for one to be added to the vehicle. This is a concern to many owners because there are currently few options in the way of adding a windscreen to the vehicle.

In order to add a windscreen to a vehicle such as the Corvette Convertible, significant modifications to the vehicle frame may have to be made in some cases to accommodate existing windscreen designs. This is a problem for many owners because the required modifications that allow for the attachment of a windscreen can raise significant issues. Owners may be hesitant to install a windscreen for example, because their use may require modifications to the vehicle, permanently altering the both the appearance and aesthetics of the vehicle.

In order to accommodate the use of a windscreen in a vehicle that does not have one built into the original design it is necessary in some cases to affix support structures for the windscreen to the vehicle itself. This may involve gluing the support structure in place or drilling holes in the frame of the vehicle to accommodate screws to attach the mounting structure or frame. These modifications are often considered undesirable. The complexity of installation of a windscreen is a task with which most owners are not comfortable with performing themselves. Furthermore, owners may also not want local mechanics to perform the installation in light of the potential expense of installation. There is also the potential to reduce the value of the vehicle should the windscreen installation be done improperly. As a result, concerns regarding installation of a windscreen prevent many owners from benefiting from their use.

In the prior art, there are several descriptions for the mounting of removable windscreens in convertible vehicles. For example a wind deflecting body for a two-seat convertible (U.S. Pat. No. 5,810,424) has been previously described. This device, while removable in nature, is bulky and requires mounting multiple structures to secure it onto the vehicle. Specifically, a series of snaps, fasteners, and locks is required to affix the wind deflecting structures in place. Furthermore, the apparatus when disassembled and not in use, occupies an undue amount of storage room when stowed in the trunk compartment.

Another wind breaking device is described in the prior art (U.S. Pat. No. 5,702,150). This apparatus consists of a rear mounted glass or Plexiglas shield. The mounting requirements for this windbreak design require the presence of a roll bar or other overhead structure to insure the apparatus can be adequately secured when driving. Such overhead structures are not present in all convertible vehicles. The mounting hardware required to temporarily affix the windscreen in many convertible vehicles, such as a Corvette Convertible, would require significant modifications to the original vehicle design.

Existing solutions to the problem of in-cockpit turbulence thus do not provide attractive options. Concerns of vehicle appearance and structural integrity at the points of attachment of the windscreen result in many owners being denied the benefit of using a windscreen. Furthermore, some designs would have no provisions to restore the vehicle design back to its original state should the use of the windscreen be discontinued permanently.

Hence, there is a need in the prior art for a lightweight, aesthetically pleasing, and functional windscreen design that efficiently reduces the problem of rearward air flow into to cockpit of a Corvette Convertible. To this end there is a need for a rear windscreen that is easy to install and does not require permanent mounting to the vehicle.

SUMMARY OF THE INVENTION

The aforementioned need for turbulence and noise reduction in a convertible, such as the Corvette Convertible, is satisfied by the self-contained, removable windscreen assembly of the present invention. In one aspect, this windscreen is comprised of a transparent screen material affixed to a frame. In one embodiment, the frame extends across and behind the seats of the convertible to both sides of the vehicle. The height of the frame is to be approximately the same level as the upper edge of the front windshield. The contour of the frame, when mounted, flushly fits into the rear cockpit contour of a 1998 Model C 5 Convertible Corvette.

In one embodiment, the invention has a mounting structure comprising two adapters. The adapters are constructed of a durable material comprising two sides substantially perpendicular to each other. One side of the adapter contains an opening of the proper size to fit over and secure to the trunk stop of the vehicle. The trunk stop consists of a raised end or head within the trunk compartment upon which the trunk door rests when it is in the closed position. The second side of the adapter comprises the adapter to which is attached to a receptacle for receiving a frame end. The receptacle is so dimensioned to allow the frame end to be removably inserted and secured within the receptacle. When the frame ends are positioned within the receptacle on the adapters, the adapters secure the frame containing the wind breaking screen. The entire assembly allows the frame to be removably attached in an upright position to the rear of the cockpit. In its functional state, the adapters securely retain the windscreen in an upright manner, behind the seats, when the top is down and the rear trunk is closed and locked. The windscreen thereby reduces road noise and turbulence within the cockpit. These important functions of the windscreen are performed while at the same time preserving the aesthetic appearance of the convertible.

In another embodiment, the windscreen also contains a sunscreen assembly. The sunscreen can be deployed when the windscreen is mounted. The sunscreen generally comprises a roller assembly about which a screen material is gathered. When in use, the sunscreen is deployed from the roller and detachably affixed to the front of the windshield of the convertible. The windscreen used together provides interior shelter from the sun while the top of the convertible is down and parked.

In both embodiments, the entire assembly can be easily and quickly removed when not in use without the use of any tools. An additional advantage is that installation and removal of the windscreen in any embodiment can be performed without any permanent alteration to the vehicle. Furthermore, the size and weight of the windscreen allow the entire device to be stored comfortably away in the trunk compartment. These and other advantages and features of the present invention will become more fully apparent from the following description and appended claims taken in conjunction with the accompanying drawings.

DETAILED DESCRIPTION OF THE PREFERRED EMBODIMENT

Figure 1:
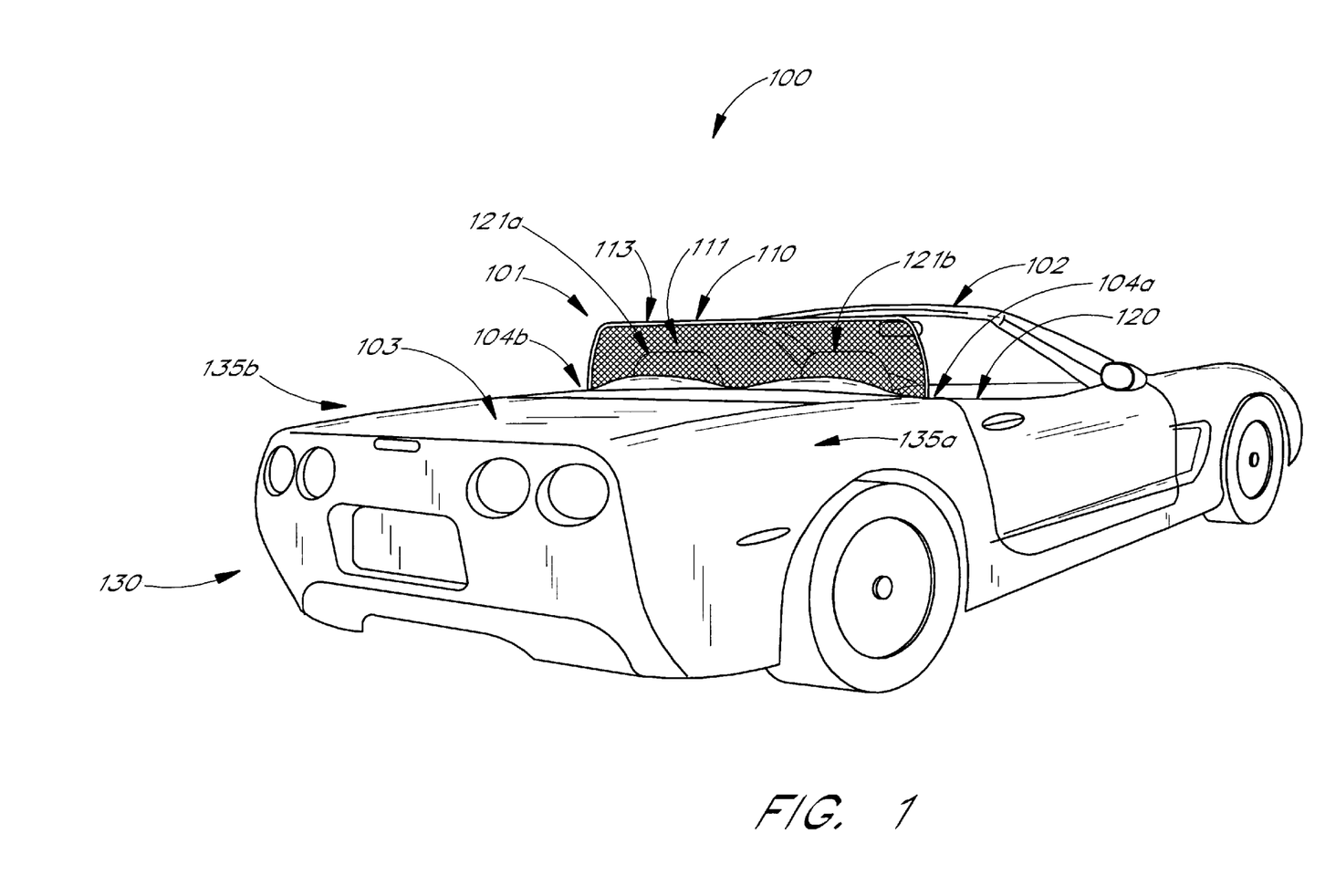
FIG. 1 is a perspective view of a vehicle, such as a Corvette Convertible, with a rear view of the windscreen mounted thereon.

Reference will now be made to the drawings wherein like numerals refer to like parts throughout. FIG. 1 illustrates a perspective view of a vehicle 100, which in this embodiment is a Corvette Convertible manufactured by General Motors, wherein a windscreen 101 is mounted in a first position in the rear of the cockpit 120 of the vehicle 100. The windscreen 101 consists of a frame 110 defining an enclosed space 113 generally rectangular in shape to which a screen material 111 is attached to enclose the area. The screen material 111 is constructed of a transparent material to insure that the passenger's view of objects to the rear of the vehicle 130 will not be obstructed. A preferred method for enclosing the area within the frame 110 uses nylon screen or mesh which is lightweight and acts as an effective barrier against incoming air.

The windscreen 101 spans the entire width of the cockpit 120 at a height substantially equal to that of the front windshield 102. The windscreen 101 is located directly in front of a trunk 103 of the vehicle 100 and behind the passenger seats 121a and 121b. The frame 110 of the windscreen 101 is detachably mounted to adapters 104a and 104b affixed in the trunk 103 and will be shown in greater detail in subsequent figures.

Figure 2:
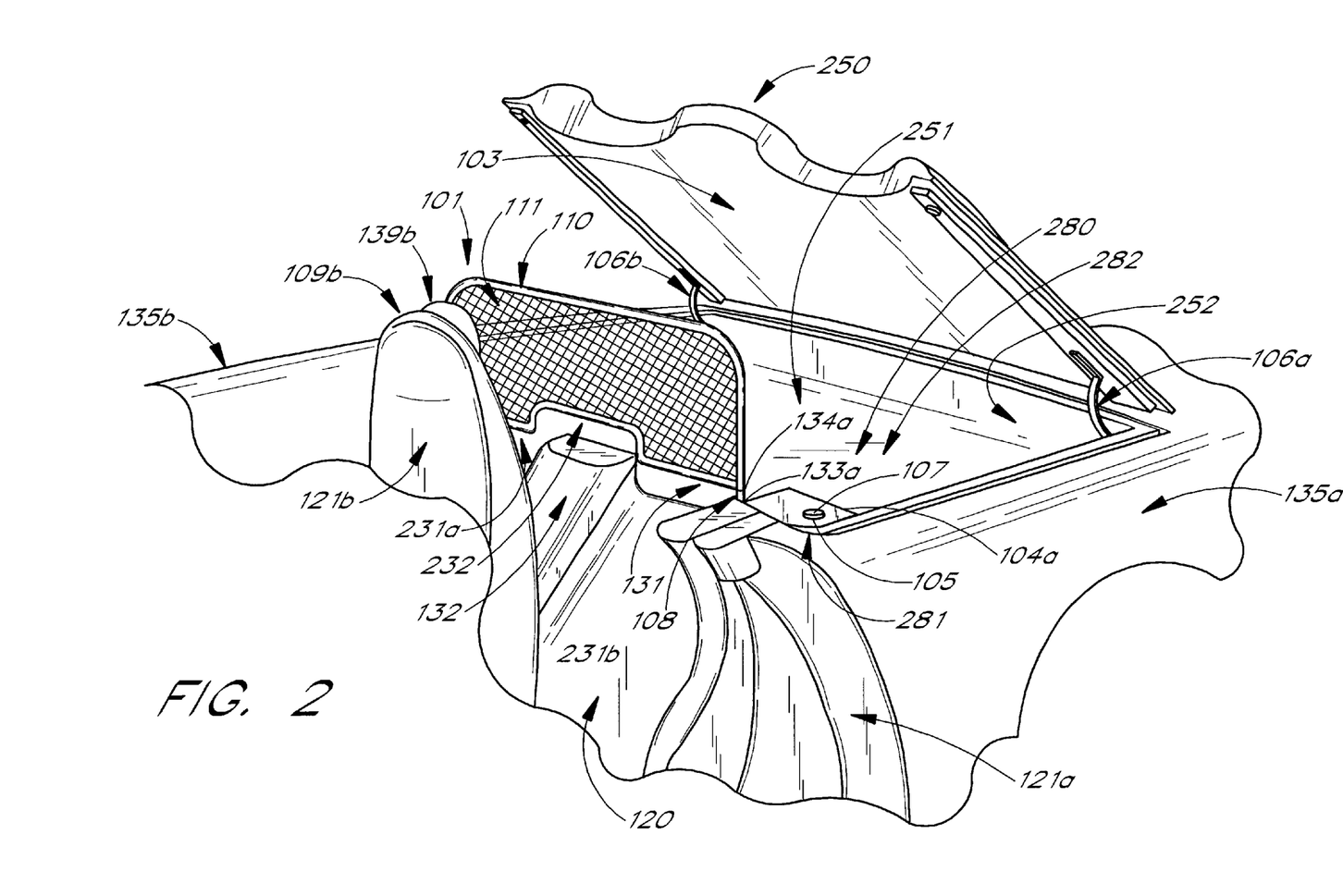
FIG. 2 is a perspective view of one side of the vehicle of FIG. 1 wherein the windscreen is attached to an adapter that is, in turn, mounted in the trunk compartment of the vehicle.

The trunk hinges 106a and 106b shown in FIG. 2, are affixed to the rear portion of the trunk door 250 and to the interior wall 252 of the trunk compartment 251. These hinges 106a and 106b allow the trunk door 250 to be opened and closed with the forward portion of the trunk door 250 raised to allow access to the interior of the trunk compartment 251. When the trunk door 250 is in a closed position, the windscreen assembly 101 engages with the trunk 103 so as to maintain the windscreen 101 in the first, vertical position. When the trunk door 250 is in the down and locked position, the entire apparatus comprising the windscreen 101 and adapters 106a and 106b, is secured in the rear of the cockpit 120 as will be described below in greater detail.

FIG. 2 illustrates a perspective view of one side of the windscreen assembly when mounted in the vehicle 100 with the trunk door 250 open and one adapter 104a visible. The windscreen 101, comprising the frame 110 and screen material 111, is additionally comprised of two frame ends 134a and 134b. The frame ends 134a and 134b are present on opposing edges of the lower section 131 of the frame 110. The frame ends 134a and 134b are lateral extensions of the frame 110 in the same plane and substantially perpendicular to the lower section 131 of the frame 110. The frame ends 134a and 134b are further configured to be of proper size and shape to allow their housing within an adapter receptacle 108 when the windscreen 101 is attached to the vehicle 100 in a manner that will be described in greater detail below.

The frame 110 is constructed to be shaped to follow the contour of the middle portion of the rear of the cockpit 120 which has a raised projection 132 extending substantially from the middle of the cockpit 120. The frame 110 of the windscreen 101, as shown, conforms to the contour of the vehicle 100 along the entire length of the bottom portion 131 of the windscreen 101. As is illustrated in FIG. 2, the bottom portion 131 of the windscreen has two outer sections 231a, 231b with a raised section 232 interposed therebetween. The outer sections 231a, 231b are positioned so as to be co-axial with the raised section 232 being raised above the outer sections 231a, 231b in the manner shown in FIG. 2. The raised section 232 is raised sufficiently above the outer sections 231a, 231b so as to accommodate the raised projection 132 in the cockpit 120 of the vehicle 100. In the Corvette convertible, the raised projection 132 comprises a center console and the bottom section 131 of the windscreen assembly 101 is adapted to be positioned about the console with the raised section 232 being raised sufficiently to accommodate the console 132 when the assembly 101 is mounted to the adapters 104a and 104b. When mounted, the bottom portion of the frame 131 fits flushly with the rear of the cockpit 120 and provides a substantially gapless barrier inhibiting air from entering the rear of the cockpit 120. It should be appreciated that while the frame 110 of the windscreen 101 is shown as a single piece of tubing, other embodiments of the windscreen can be conceived and may consist of multiple elements joined together to form a similar structure.

Figure 3:
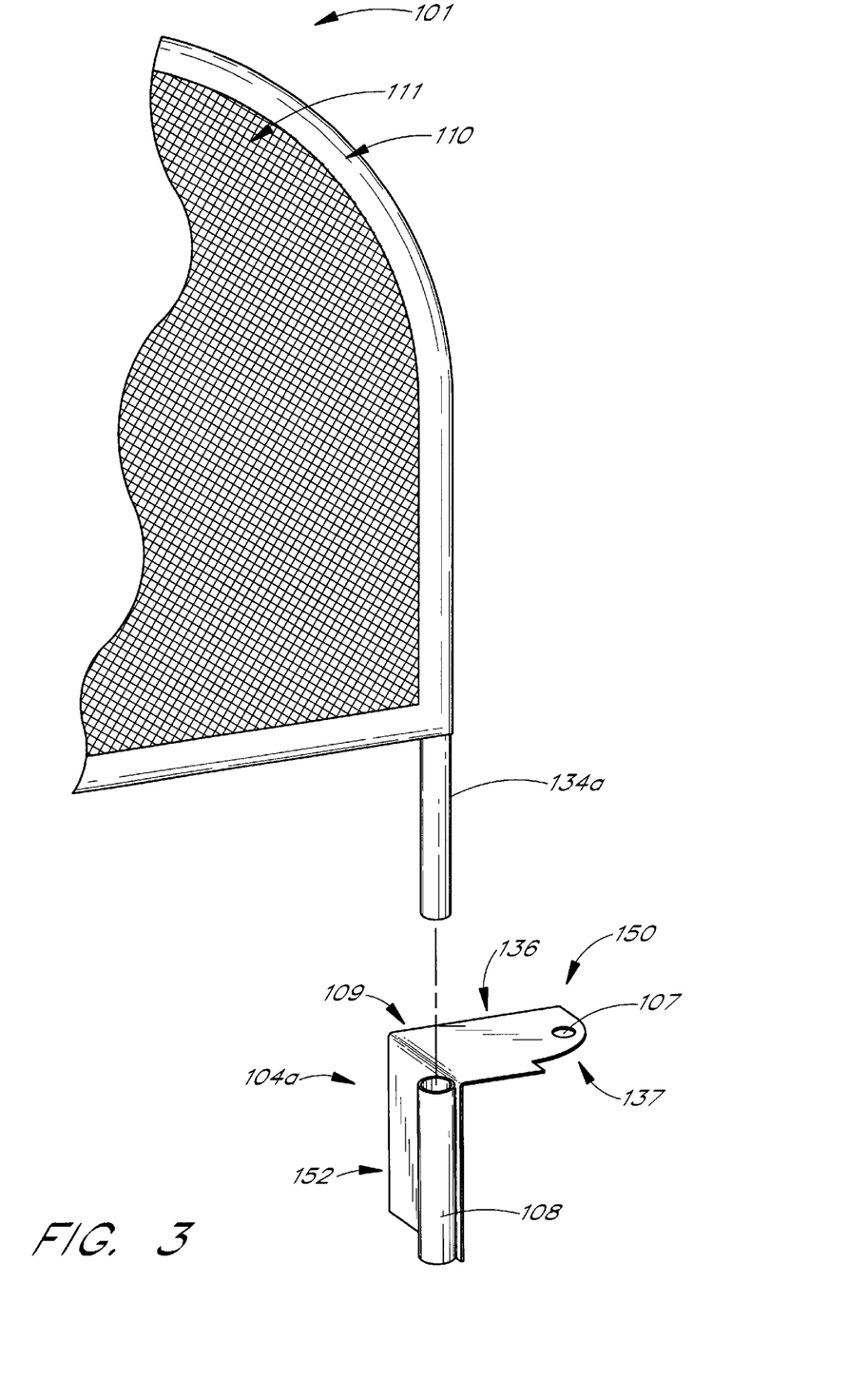
FIG. 3 is an exploded view of the adapter of FIG. 2 wherein the receptacle accepts the mounting post of the windscreen.

The adapter 104a shown in FIG. 2, and in greater detail in FIG. 3, is one of two similar elements configured to be attached to a trunk stop 105 on each side 135a, 135b of the vehicle 100. As a result, the following discussion referring to the design and function of the adapter 104a applies in a like manner to the adapter 104b.

Referring to FIG. 3, the adapter 104a consists of a plate 109 constructed of metal, hard plastic, other durable material. The plate 109, generally rectangular in shape, is formed to have two members 150, 152, positioned generally perpendicular to each other. The plate 109 is further oriented with one member 152 to be positioned in a generally vertically manner and the other member 150 positioned in a generally horizontal manner when mounted in the trunk compartment 251.

The horizontal member 150 of the adapter 104a is configured to have a straight edge 136 and a partially rounded edge 137. To accommodate the contour of the interior of the trunk door 250 upon which the horizontal member 150 of the adapter 104a rests, the horizontal member 150 is rounded along the two sides of the adapter 104a defining a corner of the horizontal member 150. The rounded edge 137 of the adapter 104a is shaped to follow the contour of the interior portion of the trunk 103 in the region of the trunk stop 105. The horizontal member 150 further comprises an area defining an opening 107 disposed generally near the front corner of the rounded side 137 of the adapter 104a.

The vertical member 152 of the adapter 104a is configured to possess a receptacle 108 for receiving a frame end 134a. In one embodiment, the receptacle 108 will consist of a tube or sleeve constructed of a material of similar durability as the plate 109. The receptacle 108 is positioned along the edge of the vertical member 152 of the adapter 104a closest to the rear cockpit 120 of the vehicle 100. The receptacle 108 is attached to the vertical member 152 in a secure and permanent manner, by welding, gluing, molding or similar methods. When horizontal member 150 of the adapter 104a is mounted so that the area defined by the opening 107 is positioned about the trunk stop 105, the receptacle 108 attached to the perpendicular member 152 of the adapter 104a and is positioned in a substantially vertical manner.

Referring again to FIG. 2, the trunk stop 105 is a raised projection, generally cylindrical in shape, that extends from the forward corner of the trunk compartment 251. Trunk stops 105a, 105b are present on both sides of the vehicle 100 in the trunk compartment 251 with the placement of the trunk stops occurring where the leading edge of the trunk door 250 rests when closed. The trunk stop 105 receives the trunk door 250 when it is in a closed position with the trunk door 250 resting upon the trunk stops 105a, 105b enclosing the area of the trunk compartment 251.

The adapter 104a can be removably joined with the trunk stop 105 by positioning the horizontal member 150 of the adapter 104a over the trunk stop 105. More specifically, the adapter 104a is properly aligned and mounted to the trunk stop 105 when the trunk stop 105 is made to pass through the area of the horizontal member 150 defined by the opening 107. In this position, the horizontal member 150 of the adapter 104a will fit flushly with the contour of the interior of the trunk compartment 251 surrounding the trunk stop 105.

The trunk stop 105 is further positioned on a ledge 280 in the comer 281 of the trunk compartment 120 nearest the cockpit 120 of the vehicle 100. The ledge comprises a horizontal component 282 upon which the trunk stop 105 is mounted and a vertical component 283 which is joined to the horizontal component 282 in a substantially perpendicular manner. The trunk stop 105 is situated on the ledge 280 in close proximity to where the ledge 280 joins with the side 135a of the vehicle 100. The adapter 104a is configured to be of appropriate size to rest over the ledge 280, such that the vertical member 152 of the adapter 104a resides vertically when the horizontal member 150 of the adapter 104a is mounted to the trunk stop 105.

The adapter 104b is positioned on the opposing side of the vehicle to similar structural elements as the adapter 104a. The adapters 104a, 104b are mounted to the trunk 103 by removably affixing to the trunk 103 about the trunk stops 105 with horizontal members 150 of each adapter 104a, 104b conforming to the size and shape to fit within the trunk compartment 251 about the trunk stops 105.

The trunk door 250 is secured in a first generally horizontal position when the trunk door 250 is closed and locked. When secured in this position the trunk door 250 rests on the trunk stops 105 and sufficient room is present between the trunk door 250 and the rear side of the cockpit 120 to allow the adapter 104a member attached to the receptacle 108 to be housed without affecting the operation of the trunk door 250. The adapters 104a, 104b further position the frame 110 containing the screen material 111 in such a way so that the normal operation of the trunk door 250 is not affected by installation of the windscreen 101.

When the trunk door 250 is in a closed and locked position, the adapters 104a, 104b are secured about the trunk stop 105 and position the receptacle 108 in the rear portion of the cockpit 120 of the vehicle 100. The receptacle 108 mounted on each adapter 104a, 104b receives a frame end 134a, 134b of the windscreen, which is inserted within the receptacle 108 to mount the frame 110 of the windscreen 111 within the cockpit 120 of the vehicle 100. The frame ends 134a, 135b are removably attached to the sides 135a, 135b of the vehicle 100 when inserted into the receptacle 108 and are secured in a substantially vertical manner as will be described in greater detail in the subsequent figure. The entire apparatus can be quickly and easily removed from a first position and stored conveniently in the trunk compartment 251.

Referring now to FIG. 3, the windscreen 101 is shown with an adapter 104a in greater detail. As previously discussed the adapter 104a comprises two members 150 and 152 joined in a generally perpendicular manner. A first member 150 of the adapter 104a has a rounded edge 137 and an area defining an opening 107 on the horizontal surface. A second generally rectangular member 152 is attached to a receptacle 108 and comprises a vertical surface positioned outside trunk compartment 251 in the area of the cockpit 120 directly adjacent to the trunk 103. The width of the vertical member 152 is of sufficient dimensions to locate the receptacle 108 forward of the trunk door 250. The vertical member 152 of the adapter 104a and receptacle 108 are so positioned to allow attachment of the windscreen 101 to the receptacle 108 without interfering with the operation of the trunk door 250.

The frame end 134a is attached to the bottom corners of the frame of the windscreen 101. Each frame end 134a and 134b extends along an axis generally perpendicular with the bottom edge of the frame 110. In a preferred embodiment, the length of the frame end 134a is generally the same as the length of the receptacle 108 that houses it. This configuration may be advantageously used to afford a maximum of stability when the frame end 134a is inserted into the receptacle 108. When the frame end 134a is inserted into the adapter receptacle 108, the frame 110 is positioned in such a way as to flushly fit against the rear portion of the cockpit 120. When the area defined by an opening of the horizontal member 150 of the adapter 104a is positioned about the trunk stop 105, the receptacle 108 attached to the adapter 104a is directed in such a manner as to hold the frame end 134a, to which it mounts, in a substantially vertical position. The frame 110 when mounted in the receptacle 108 conforms to the contour of the vehicle 100 and is positioned immediately in front of the trunk 103 and to the rear of the passenger seats 121a, 121b.

Figure 4:
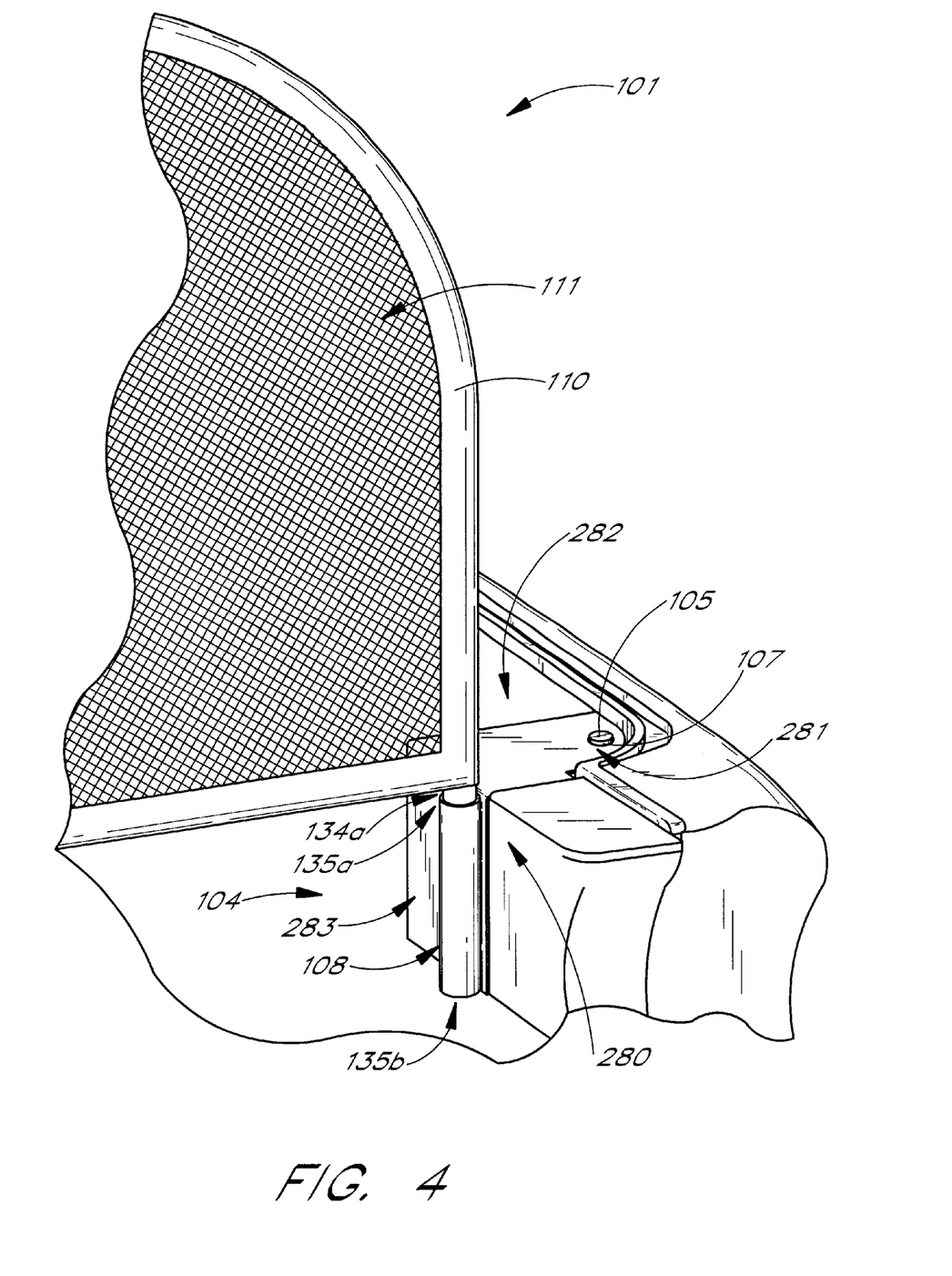
FIG. 4 is an exploded view of the adapter assembly joined with the windscreen and mounted in the trunk area.

Referring to FIG. 4, a perspective view of the windscreen 101 with an adapter 104a mounted on a trunk stop 105 is shown in greater detail. The area of the horizontal member 150 of the adapter 104a defining an opening 107 is positioned to fit over the trunk stop 105. In this position, the trunk stop 105 secures the adapter 104a upon which it rests. The frame 101 containing the screen material 111 can then be mounted in the receptacle 108 of the adapter 104a and the trunk door 250 closed and locked to maintain the position of the windscreen 101. The receptacle 108 attached to the adapter 104a is further positioned outside of the trunk compartment 251 in the rear of the cockpit 120. The entire windscreen assembly comprising the elements of the frame 101, screen material 111, and adapters 104a, 104b do not interfere with the normal operation of the trunk 103 and can be easily removed when not in use. The method of disassembly of the windscreen 101 is accomplished in one of two preferred methods. In a first method, the frame 110 is removed from the receptacle 108 leaving the adapters 104a, 104b attached to the trunk stops 105 within the trunk compartment 251. Alternatively, in a second method both the frame 110 and the adapters 104a, 104b are removed from the vehicle 100. The components of the windscreen, in part or whole, are of suitable size for storage within the trunk compartment 251 when not in use.

The two methods by which the windscreen 101 and adapter assemblies 104a, 104b can be mounted and stowed increases the flexibility and overall utility of this system. When leaving the adapters 104a, 104b mounted about the trunk stops 105 in the trunk compartment 251, the windscreen 101 can be rapidly deployed and removed to suit the desires of the occupants of the vehicle 100. Furthermore, should the vehicle occupants depart temporarily from the vehicle 100, easy storage within the trunk compartment 251 of the windscreen frame 110 frees the occupants from concerns about theft of the windscreen frame 110 while away.

Figure 5A:
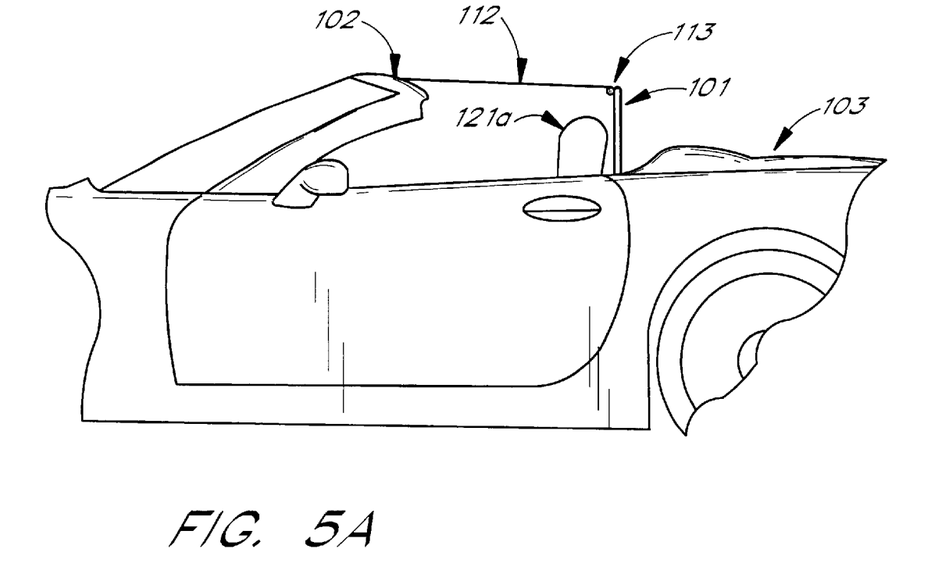
FIGS. 5A–5B are two perspective views of a preferred method for attaching a sunscreen to the windscreen and the forward windshield of the vehicle of FIG. 1.
Figure 5B:
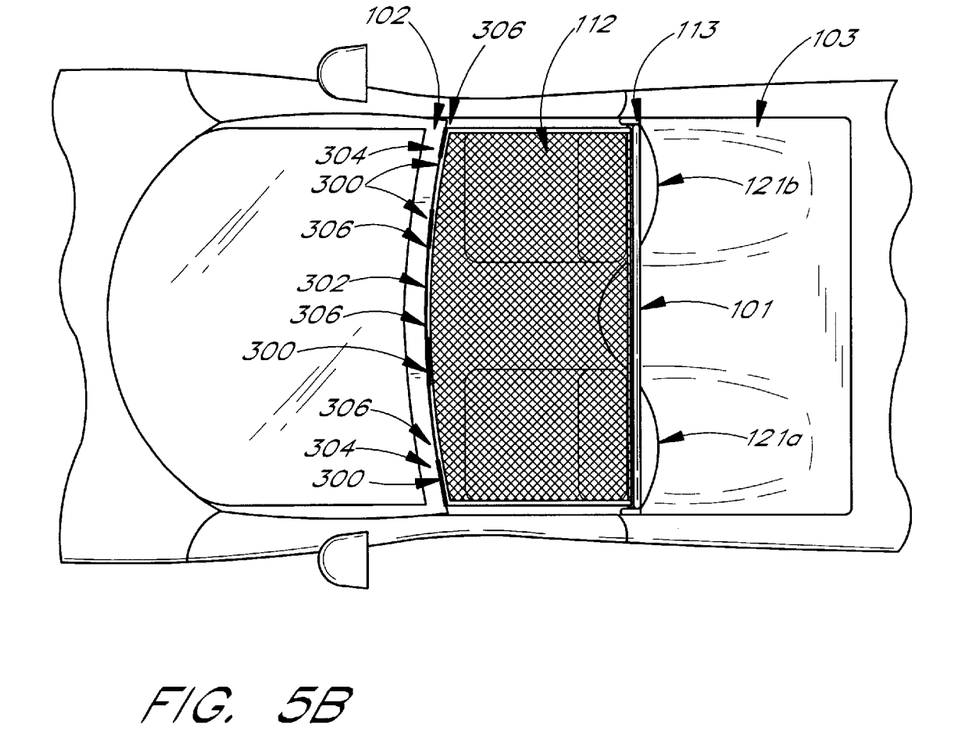

Referring to FIG. 5, a mesh sunscreen 112 and roller assembly 113 is shown. The roller assembly 113 is attached to the upper portion of the windscreen 101 along the frame 110. Furthermore, the roller assembly 113 is configured to be of sufficient length to extend over a majority of the distance spanning between the sides 135a, 135b of the vehicle 100. The roller assembly 113 further houses a nylon mesh sunscreen 112 and maintains it in a first position, gathered about the roller 113 in a circular manner. The sunscreen material 112 is dimensioned of sufficient length so as to be extendible over the region of cockpit space bounded by the windscreen 101 and the front windshield 102. The sunscreen 112 is engaged by manually drawing the screen material from the roller assembly 113. The mesh sunscreen 112, once deployed, is then removably attached to the front windshield 102 in a second position. The removable manner of attachment to the front windshield 102 can be accomplished in a number of ways. In one embodiment, the sunscreen 112 may be attached through the use of one or more Velcro strips 306 positioned along the upper edge of the windshield 102 with the sunscreen 112 further having Velcro attachments 300 on the leading edge 302 allowing for attachment. In another embodiment, the sunscreen 112 may have one or more hook assemblies 304 along the edge 302 of the sunscreen material which can be removably attached to the windshield 102 or components near the windshield 102 such as a sun visor. The sunscreen 112, when engaged in the second position, traverses the cockpit 120 in a substantially horizontal manner and covers the passenger area of the cockpit 120. In this position, the sunscreen 112 is able to reduce the amount of sunlight directed towards the occupants of the vehicle 100. Additionally, wind noise and turbulence are reduced when the sunscreen 112 is deployed in conjunction with the windscreen 101.

The windscreen 101 of the present design provides a method by which the unit can be easily attached and removed from a vehicle 100 and whose attachment does not require any significant or permanent modifications to the vehicle 100 itself. When detached from the vehicle 100, the windscreen 101 can be easily stored away for later use in a comfortable manner. Thus, those vehicles, such as the Corvette Convertible, that do not posses a windscreen integrated into the design of the vehicle and whose owners do not wish to alter the original vehicle components to accommodate such a device can benefit from an easily attachable wind brake which requires little technical skill to install.

The windscreen 100 of the present invention may further incorporate an integrated sunscreen 112 into the design. The sunscreen 112 is easily deployed and completely retractable. The components of the sunscreen 112 are housed unobtrusively on the windscreen 100 itself requiring no special tools or skills for installation. In this embodiment, the user gains the benefit of additional turbulence reduction, further improving in-cockpit conditions. The sunscreen 112 is able to block the majority of overhead glare further improving driving conditions while maintaining the stylish and aesthetic appeal of a convertible vehicle. The sunscreen 112 can also be used when the vehicle is parked so as to protect the occupant of the vehicle from the sun and provide a cooler, shadier environment.

Although the foregoing description of the invention has shown, described and pointed out novel features of the invention, it will be understood that various omissions, substitutions, and changes in the form of the detail of the apparatus as illustrated as well as the uses thereof, may be made by those skilled in the art without departing from the spirit of the present invention. Consequently the scope of the invention should not be limited to the foregoing discussion but should be defined by the appended claims.

What is claimed is:

1. A rear windscreen for a vehicle having a trunk for receiving a collapsible roof, the trunk having a hinged door and hinge stop upon which the hinged door rests when the door is closed to at least partially enclose the trunk, the rear windscreen comprising:
   a frame defining an enclosed space;
   a screen material attached to the frame so as to be positioned in the enclosed space;
   at least one mounting structure comprising an adapter that is shaped to receive the hinge stop upon which the hinged door rests and which is adapted to be mounted on an interior surface of the trunk wherein the mounting structure engages the frame so that when the at least one mounting structure is mounted to the interior surface of the trunk and the hinged door is in the closed position, the frame is maintained in a first position wherein the screen material inhibits the flow of air into the cockpit of the convertible.

2. The windscreen of claim 1, wherein the adapter has an opening formed therein that is shaped to receive the hinge stop upon which the hinged door rests.

3. The windscreen of claim 2, wherein the at least one mounting structure comprises two mounting structures mounted at two opposite ends of the frame.

4. The windscreen of claim 2, wherein the at least one mounting structure further comprises a receptacle attached to the adapter so as to receive an exposed end of the frame wherein the adapter is captured by the trunk door and the hinge stop and the exposed end of the frame is positioned within the receptacle so as to retain the frame in the first position.

5. The windscreen of claim 4, wherein the adapter is positioned about the hinge stop so that the plane of the adapter is generally parallel to the plane of the trunk door when the trunk door is closed and wherein the receptacle is attached to an end of the adapter so that the axis of the receptacle has a component that is perpendicular to the plane of the trunk door in the closed position.

6. The windscreen of claim 5, wherein the frame has a curved portion so that the frame is positioned flushly adjacent to an interior surface of the cockpit.

7. The windscreen of claim 6, wherein the windscreen is dimensioned and spaced to be captured by the trunk door and the hinge stop of a 1998 Model C 5 convertible Corvette automobile manufactured by General Motors Inc.

8. The windscreen of claim 1, further comprising a sunscreen assembly that is attached to the frame so as to permit a sunscreen to be deployed over the cockpit of the convertible.

9. The windscreen of claim 8, wherein an upper portion of the frame contains a roller assembly housing the sunscreen which can be rollably deployed over the cockpit and secured to a front windshield.

10. The windscreen of claim 9, wherein the sunscreen comprises a roller assembly that is mounted on the frame in a substantially horizontal manner.

11. The windscreen of claim 10, wherein the roller assembly can retractably deploy the screen material over the upper portion of the cockpit space of the convertible in a substantially horizontal manner.

12. The windscreen of claim 11, wherein the screen material can be detachably mounted to the front windshield.

13. A rear windscreen for a vehicle having a trunk for receiving a collapsible roof, the trunk having a hinged door wherein the trunk defines at least one hinge stop upon which the hinged door rests when the hinged door is in the closed position, the rear windscreen comprising:
   a frame defining an enclosed space;
   a screen material attached to the frame so as to be positioned in the enclosed space;
   means for detachably mounting the frame within the trunk of the vehicle so that the frame is maintained in a first position by the hinged door when the hinged door is closed such that the frame and screen material inhibit the flow of air into the cockpit of the convertible.

14. The windscreen of claim 13, wherein the screen material comprises a wind resistant nylon mesh material.

15. The windscreen of claim 13, wherein the frame defines a generally rectangular enclosed space.

16. The windscreen of claim 13, wherein the means for detachably mounting the frame comprises a mounting adapter that has an opening dimensioned to fit around the at least one hinge stop such that the adapter is captured about the at least one hinge stop when the trunk is in the closed position.

17. The windscreen of claim 16, wherein the means for detachably mounting the frame further comprises a receptacle attached to the mounting adapter so as to receive an end of the frame therein to thereby retain the frame in the first position.

18. The windscreen of claim 17, wherein the receptacle is mounted so that the axis of the receptacle is substantially perpendicular to the plane of the mounting adapter.

19. The windscreen of claim 18, wherein the mounting adapter is positioned within the trunk so that the plane of the mounting adapter is substantially parallel to the plane of the trunk when the trunk is in the closed position.

20. The windscreen of claim 13, further comprising a sunscreen assembly mounted on an upper portion of the frame in a substantially horizontal manner.

21. The windscreen of claim 20, wherein the sunscreen assembly further comprises a roller and sunscreen which is retractably gathered about the roller and attached to the roller on one end.

22. The windscreen of claim 21, wherein the sunscreen further comprises a length of nylon mesh of sufficient length such that when extended from the roller, the screen can span the distance between the frame and the front windshield in a substantially horizontal manner and be secured to the front window in a detachable manner.

23. A rear windscreen for a vehicle having a trunk for receiving a collapsible roof, the trunk having a hinged door wherein the trunk defines at least one hinge stop upon which the hinged door rests when the hinged door is in the closed position, the rear windscreen comprising:

a frame defining an enclosed space and having an exposed end;

a screen material attached to the frame so as to be positioned in the enclosed space;

a least one mounting structure comprising an adapter defining an opening to receive the hinge stop of the trunk so as to retain the adapter in a first position, the mounting structure further comprising a receptacle attached to the adapter dimensioned to accept the exposed end of the frame wherein the receptacle is attached to the adapter such that when the adapter is mounted on the hinge stop and the exposed end of the frame is positioned within the receptacle and the trunk is closed, the frame is secured in a first position adjacent the rear of the cockpit of the convertible so as to inhibit the entry of air into the cockpit.

24. The windscreen in claim 23 wherein the adapter is angled having two sides which are generally aligned perpendicular to one another, wherein, when the trunk is closed, a first side of the adapter containing the opening engaging the trunk stop is positioned along an axis generally parallel with the trunk securing the adapter.

25. The windscreen of claim 24, wherein when the trunk is closed and the first side of the adapter containing the opening has engaged the trunk stop, a second side of the adapter attached to the receptacle is positioned along an axis substantially perpendicular with the trunk door.

26. The windscreen of claim 25, wherein when the end of the frame is positioned within the receptacle, the frame is secured in a generally vertical manner behind the seats of the convertible.

27. The windscreen of claim 26, wherein the frame is dimensioned and spaced to follow an interior surface contour of the rear cockpit of a 1998 Model C 5 Convertible Corvette manufactured by General Motors Inc.

28. The windscreen of claim 23, further comprising a sunscreen assembly consisting of a roller and nylon mesh attached to the upper frame of the sunscreen in a substantially horizontal manner.

29. The windscreen of claim 28, wherein the roller is attached to one end of the nylon mesh which can retractably gather the nylon mesh about the roller.

30. The windscreen of claim 29, wherein the nylon mesh is of sufficient length so as to be extendible over the cockpit in a substantially horizontal manner and further provides means for attaching the screen to the front windshield in a detachable manner.

* * * * *